(No Model.)

W. F. DRAPER.
PACKING FOR SPINDLE BEARINGS.

No. 253,020. Patented Jan. 31, 1882.

Witnesses.
W. H. Sigoton
L. F. Connor

Inventor.
William F. Draper.
by Crosby & Gregory Attys

UNITED STATES PATENT OFFICE.

WILLIAM F. DRAPER, OF HOPEDALE, MASSACHUSETTS.

PACKING FOR SPINDLE-BEARINGS.

SPECIFICATION forming part of Letters Patent No. 253,020, dated January 31, 1882.

Application filed August 5, 1881. (No model.)

*To all whom it may concern:*

Be it known that I, WILLIAM F. DRAPER, of Hopedale, Worcester county, State of Massachusetts, have invented an Improvement in Packing for Spindle-Bearings, of which the following description, in connection with the accompanying drawings, is a specification.

This invention relates to an improved elastic tubular packing to inclose the lateral or side bearings of vertical spindles.

My invention is especially applicable for use with lateral bearings made in sections; but I desire it to be understood that I do not herein claim such sectional lateral bearings. Each piece composing the lateral bearing, to secure the best effects, should be held pressed in contact with that part of the spindle within it, to thus insure that some part of the spindle be properly supported by each section. The elastic packing, composed of threads or yarns braided to form a tube, in order to insure such contact between each section and the spindle, has in this my invention been provided with one strand of thread or yarn of much greater diameter or thickness than the other threads or yarns employed in the said tubular packing, the said large strand extended helically or spirally throughout the packing, falling between one side only of each of the sections and an opposed surrounding stationary and rigid tube or support, so that the said strand, acting only on one side of a section of the lateral bearing, presses the said section hardest toward and against the spindle from the direction where the said enlarged strand touches the bearing-section. The introduction of this enlarged pressing-strand into the packing helically is of my invention.

Figure 1:
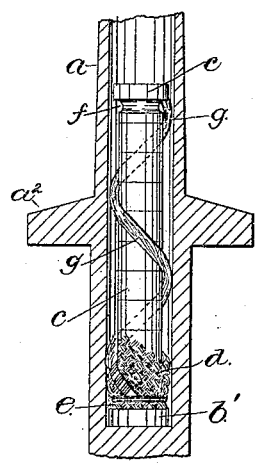
Figure 2:
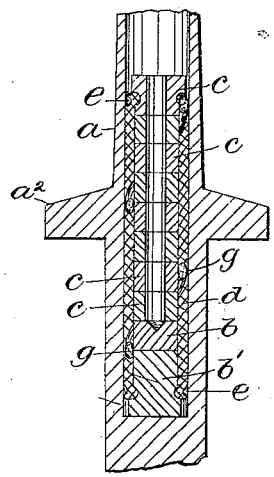

Figure 1 represents in vertical section a rigid stationary tube or support, showing located therein, in elevation, a sectional lateral or side bearing, with part of a tubular elastic packing thereon, the said packing being, however, broken away to show the enlarged helical strand which is introduced therein in accordance with my invention. Fig. 2 is a vertical section of Fig. 1 as it would appear with the elastic packing entire.

The tube or support $a$, rigid and stationary, has a suitable collar, $a^2$, by which to support it upon a rail or other holder (not shown.)

The spindle (not shown) will have its lower end supported by the foot-step $b\ b'$, which may be made in one or two pieces.

The sections $c$ (eight being shown in the drawings, Fig. 2) compose the lateral or side bearing for the spindle which will be inserted into the openings of the said sections. The upper one of the sections $c$ and the lower portion, $b'$, of the step are held together end to end by the elastic tubular packing $d$, which, made as a braided fabric on a braiding-machine of usual construction, is connected with the said parts $c$ and $b'$ by means of strings or wires, as at $e$, which force the packing into the annular grooves $f$ made in said pieces.

In this my invention one of the bobbins of one of the travelers of the braiding-machine will be provided with a strand, $g$, of larger diameter than the threads or yarns carried by the bobbins of the other travelers, and the said large strand $g$—called by me the "forcing-strand"—will be extended helically through the said braided fabric or packing, and will follow around the sections $c\ c$, as shown clearly in Fig. 1, where to best show it I have taken away (except near its lower end) all the threads composing the main or chief part of the said packing. The forcing-strand $g$ touches each section $c$ at but one portion of its periphery, and, located between the said section and the interior of the rigid tube $a$, acts to press each of the said sections toward the spindle from that side where the strand lies. In this manner it will be seen that the pressure on each section is a little different in direction than that of any other included within the space covered by the strand $g$ in one passage about the sections $c$, and the spindle within the said sections throughout that part of it surrounded by said sections is positively pressed and held by some part of each section, which fact enables the spindle to be run with the least vibration and jar.

I claim—

1. The improved elastic packing composed of a braided fabric having an enlarged strand, $g$, extended helically through it, substantially as described.

2. The tube or support *a* and the lateral or side bearing, composed of sections *c*, combined with and connected together by means of the elastic packing, having an enlarged forcing-strand, *d*, extended helically therethrough, to operate substantially as and for the purpose described.

In testimony whereof I have signed my name to this specification in the presence of two subscribing witnesses.

WM. F. DRAPER.

Witnesses:
F. J. DUTCHER,
ARTHUR H. BALL.